May 23, 1950 B. W. SCHWINDT 2,508,804
RETRACTABLE SHELF SUPPORT FOR COUNTERS AND THE LIKE
Filed Nov. 18, 1947 2 Sheets-Sheet 1

INVENTOR.
BENJAMIN W. SCHWINDT
BY Duell F Kane
ATTORNEYS.

May 23, 1950   B. W. SCHWINDT   2,508,804
RETRACTABLE SHELF SUPPORT FOR COUNTERS AND THE LIKE
Filed Nov. 18, 1947   2 Sheets-Sheet 2
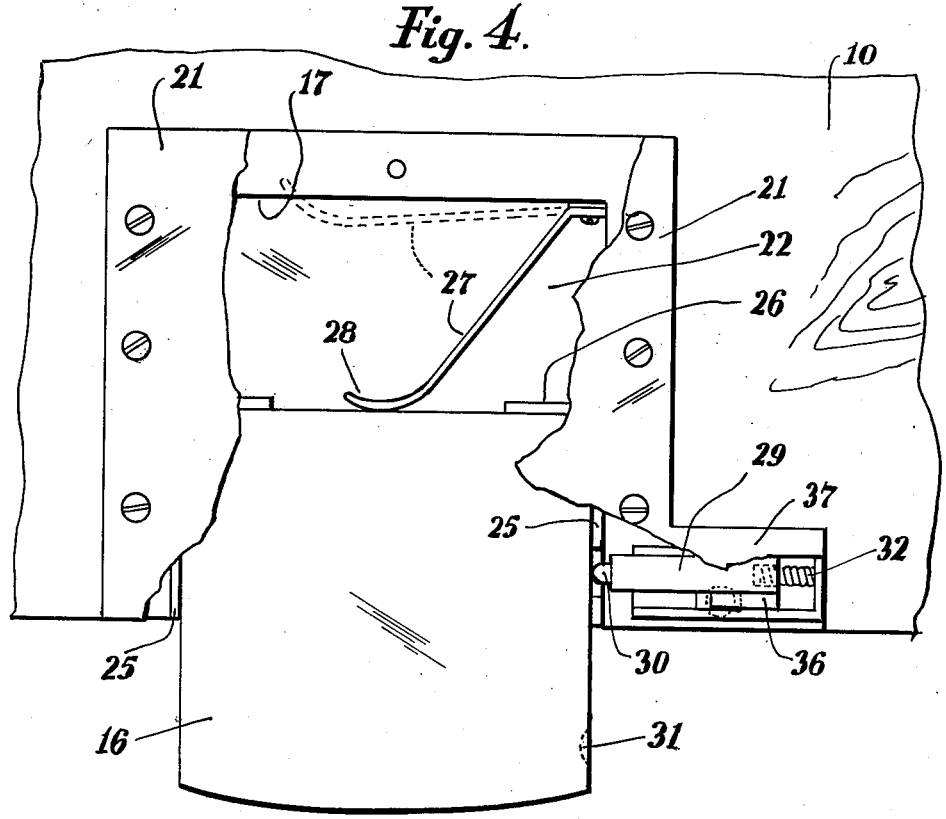
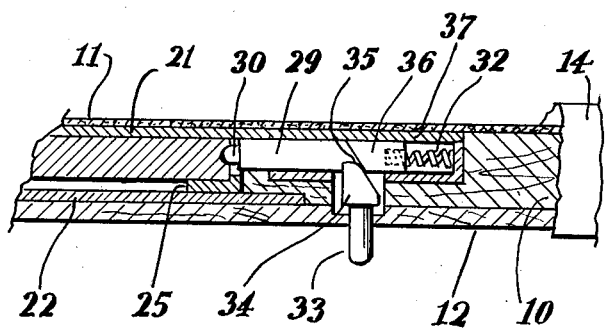
INVENTOR.
BENJAMIN W. SCHWINDT
BY
*Drell F Kane*
ATTORNEYS.

Patented May 23, 1950

2,508,804

UNITED STATES PATENT OFFICE 2,508,804

RETRACTABLE SHELF SUPPORT FOR COUNTERS AND THE LIKE

Benjamin W. Schwindt, Freeport, N. Y.

Application November 18, 1947, Serial No. 786,732

3 Claims. (Cl. 311—17)

This invention relates to an improved retractable support for fixtures, tools, kitchen utensils and appliances for use with sink tops and counters.

Many tools, implements and appliances commonly employed in kitchens and restaurants, such as meat grinders, knife sharpeners and the like, are held in position when in use by a clamp similar to a C-clamp forming an integral part of the tool. The clamp is applied to a counter or table and supports the tool in operative position. Modern sink tops and counters, however, are formed in such a manner that many of the standard clamps on such tools cannot be applied thereto.

It is an object of the present invention to overcome this difficulty and to provide a retractable support, in the form of a slide, for tools and implements of this type and which may be incorporated in or applied to sink tops and counters.

A further object is the provision of an improved support of the above type which will not mutilate or detract from the appearance of the sink top or counter, which is sufficiently strong and sturdy to provide adequate support for tools of this type and which can be retracted into the counter or sink top when not in use and partially withdrawn therefrom when it is desired to use it.

A further object is the provision of a retractable support for appliances and tools of the above character which is so designed and arranged as to protect the counter from damage or injury from the tool.

Among other objects is the provision of a retractable support for appliances and tools which is of sturdy construction, which does not weaken the counter and which is relatively simple to manufacture, assemble with the counter and use.

In the drawings—

Fig. 4 is a plan view, with the covering, cover plate and portions of the counter omitted, showing a modified type of retractable support in projected position embodying mechanism for causing the slide to automatically project; and Fig. 5 is a cross-sectional view of the releasable catch mechanism of Fig. 4 showing the catch in closed or engaged position.

Figure 1:
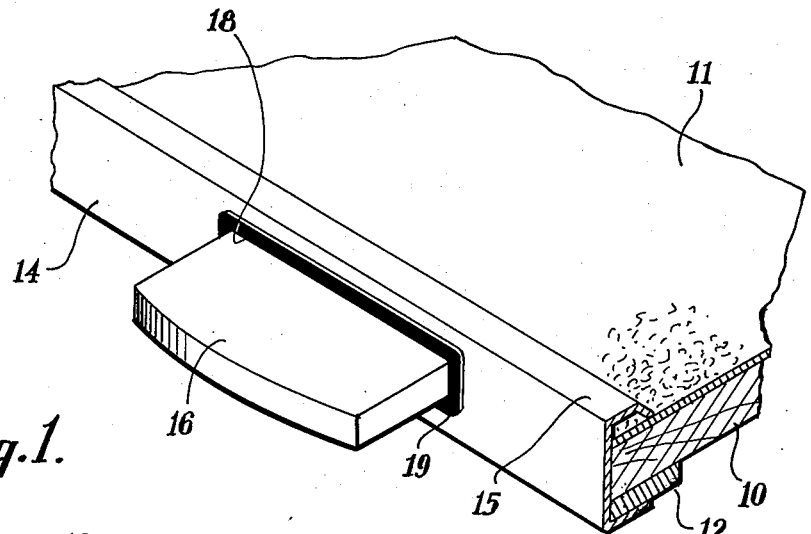
Fig. 1 is a perspective view of a sink top or counter having a retractable support embodying my invention applied thereto and showing the slide in extended position.

My improved retractable support consists generally of a retractable slide mounted inside the sink top or counter and which is projectable and retractable through the binding strip or facing along the edge thereof.

In the drawings I have shown my invention as applied to one conventional type of sink top or counter consisting of a base portion 10 a protective covering 11 a strip of edging material 12 on the undersurface of the base portion and a binding or facing 14 over the outer edge thereof.

The base portion 10 is made of suitable material such as plywood although it may also be made of other suitable material such as wood planking or metal. The protective or decorative material 11 commonly consists of a sheet of linoleum laminated to the upper surface of the base portion but may also be made of other suitable sheet material such as stainless steel or of a plastic material generally known in the trade as decorative laminate. The edging material 12 may be wood or metal. The facing or binding 14 is made of sheet metal preferably of a corrosion resisting type such as stainless steel, Monel-metal or the like.

The binding or facing is held in place by overlapping the upper and lower surfaces of the counter as shown. The upper overlapping portion 15 preferably projects upwardly above the counter and takes the form of a beading.

The counter or sink top, as so far described, is one type of conventional construction and because of the arrangement of the edging 12 and the binding and facing 14, many of the standard clamps applied to kitchen tools and utensils such as meat grinders, knife sharpeners and the like cannot be attached thereto.

In accordance with the present invention I overcome this difficulty by providing a projectable and retractable support in the form of a slide 16 which is mounted inside the counter and projects through the binding or facing 14. The slide is so arranged as to be shiftable between the fully extended position shown in Figs. 1 and 3 and the fully retracted position shown in Fig. 2. So as to provide adequate support for the kitchen utensil or appliance the slide is made of a strong, rugged material such as a metal preferably iron or steel. It is preferably generally rectangular in shape and may have a rounded outer or leading edge to improve its appearance and a finger recess 20 on the undersurface thereof to facilitate its operation.

As previously stated the slide is mounted inside the counter and for this purpose the base is provided with a recess 17 large enough to accommodate the slide and the guides and supports therefor. So that the slide may be projected through the facing or binding the facing is provided with an opening 18 large enough to permit the slide to fit therethrough and I preferably secure a gasket or cushion of rubber 19 around the outer face of the opening to protect the facing from damage in the event the slide should be accidentally retracted while the kitchen utensil or appliance is attached thereto.

The recess 17 is preferably closed by cover plates 21 and 22 fitted to the upper and lower surfaces thereof and countersunk around the edges of the opening. The cover plates are suitably held in place as for instance by nuts and bolts 23 and 24.

Figure 2:
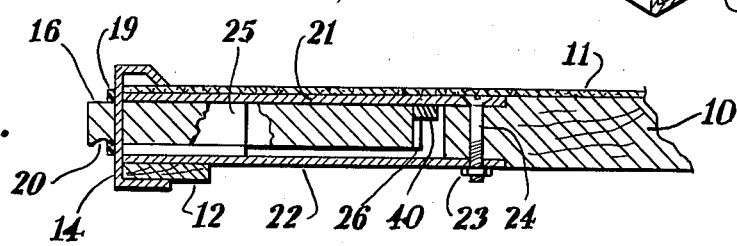
Fig. 2 is a cross-sectional view, through the center of the retractable support and associated portions of the sink top or counter, showing the slide in retracted position.
Figure 3:
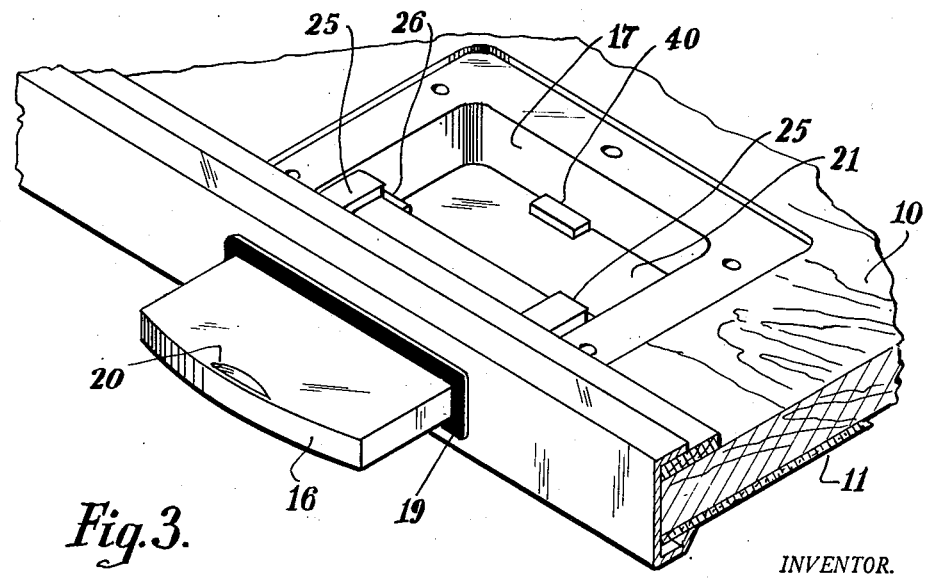
Fig. 3 is a perspective view of the assembly shown in Figs. 1 and 2 from the undersurface thereof and with the bottom cover plate removed.

The slide 16 is supported or mounted inside the recessed portion of the counter by means of channel-like guide tracks 25 supported from plate 21, as by welding, and embracing the opposite lateral edges of the slide. The engagement between the tracks and the slide is such as to permit the slide to shift inwardly and outwardly but is sufficiently snug or tight to prevent undue lateral or vertical movement of the slide. As shown in Figs. 2 and 3 the guide tracks extend downwardly from plate 21 along the vertical side edges of the slide and are provided with flanges overlapping the undersurface of the slide.

The guide tracks, it will be noted, only extend for about half the length of the slide and serve as stops to prevent the complete withdrawal of the slide. Thus, when the slide is withdrawn to the position shown in Figs. 1, 3 and 4 the guide tracks are engaged by stop lugs 26 secured as by welding to the rear edge of the slide and projecting laterally beyond the sides thereof so as to engage the guide tracks in the manner shown. A stop lug 40 may also be secured to the undersurface of the top cover plate 21 so as to engage the slide when it has been retracted to the position shown in Fig. 2. In this manner a sufficient amount of the slide projects from the facing or binding to permit the operator to engage the finger recess 20 and to withdraw the slide.

When a retractable support of the type shown and described herein is applied to a sink top or counter it can be retracted to the position shown in Fig. 2, when not in use. Under those circumstances it will not obstruct or interfere with the space in front of the counter. When it is desired to use a utensil or appliance such as a meat grinder, knife sharpener or the like, the slide 16 is projected to the position shown in Figs. 1 and 3 and the appliance is clamped thereto in the usual manner.

It will be appreciated that the slide provides sturdy and adequate support for the utensil and in this way the appliance can be used without mutilating or damaging counter. If the slide is accidentally shifted inwardly while the appliance is attached thereto, the gasket or cushion 19 protects the facing from injury.

If desired, the slide may be made so as to be automatically projectable by an arrangement such as that shown in Figs. 4 and 5. In these figures I have shown a counter or sink top construction of the same type as shown in the first three figures of the drawing. I have also shown the same type of retractable support applied thereto. However, in this case I have mounted a spring 27 at the rear of the recess 17 and at one side thereof. This spring is made of suitable spring material such as spring steel and extends forwardly and presses against the rear edge slide 16. The outer end of the spring is preferably bowed in the manner indicated at 28.

The spring is arranged so as normally to exert pressure against the slide to force it outwardly to the projected position shown in full line Fig. 4. However, the slide may be shifted inwardly manually and the spring will then assume the position shown in dotted lines in Fig. 4 and the slide will then be held in retracted position by means of a releasable catch.

The releasable catch may take any desired form. Thus, it may take the form of a slide or detent 29 mounted in the base 10 of the counter at one side of the slide 16 and having a rounded pintle or end 30 engageable with a similarly shaped recess 31 formed in the slide in a position to be engageable with the pintle when the slide is fully retracted. The detent is normally pressed towards the slide 16 by means of a helical spring 32 also mounted in the base of the counter and engaging the end of the detent.

The catch may be released so as to permit the spring to shift the slide 16 outwardly by means of a small push button 33 projecting through the bottom of the counter near the forward edge thereof. The push button is mounted on a shiftable member 34 having a cam surface 35 engageable with a similar cam surface formed on an abutment 36 on the side of detent 29. When the push button 33 is pressed upwardly the cam surface causes detent 29 to shift to the right as viewed in Figs. 4 and 5 against the tension of spring 32 with the result that spring 27 forces slide 16 outwardly to the position shown in Fig. 4. When push button 33 is released the push button and member 34 drop downwardly under gravity with the result that when slide 16 is shifted to retracted position spring 32 causes detent 29 to again engage recess 31 thereby locking the slide in retracted position as shown in Fig. 5.

The catch assembly may be supported in suitable fashion as from an extension 37 formed on plate 21.

Aside from the automatic projection of the slide 16 the retractable support shown in Figs. 4 and 5 is used in the same manner as the support shown in the first three figures of my drawing.

It should be understood that I do not intend to be limited to the specific sink top or counter construction shown in the accompanying drawing and that also modifications may be made in the illustrated and described embodiments of my invention without departing from the invention as set forth in the accompanying claims.

I claim:

1. An improved counter or sink top comprising a flat base panel formed with an opening extending therethrough at the outer edge thereof and with a recess extending around said opening, a cover plate over the top of said opening and countersunk in said recess so as to be flush with the upper surface of the base panel, a surfacing of ornamental protective material over the top of the base panel and cover plate, a metallic facing along the outer edge of said base panel and surfacing and extending across the opening, said facing being formed with a slot-like opening intermediate its upper and lower edges communicating with the opening in the base panel, a retractable support comprising a slide mounted in the opening in the base panel and being projectable and retractable through the slotted opening in the facing, stop means for preventing the complete withdrawal of the slide through said slotted opening and further stop means for limiting the retraction of the slide so that the leading edge thereof projects slightly through the slotted opening in the facing when the slide is fully retracted.

2. An improved counter or sink top as set forth in claim 1 in which the cover plate serves as a support and has mounted thereon a pair of guide tracks engaging opposite sides of the slide and also the stop means for limiting the movement of the slide.

3. An improved counter or sink top as set forth in claim 1 in which spring means are provided in the opening in the base panel in engagement with the slide to urge it into outwardly projected position and a releasable catch is also provided to hold the slide in retracted position.

BENJAMIN W. SCHWINDT.

REFERENCES CITED

The following references are of record in the file of this patent:

UNITED STATES PATENTS

| Number | Name | Date |
| --- | --- | --- |
| 477,762 | Larsson | June 28, 1892 |
| 686,249 | Beery | Nov. 12, 1901 |
| 1,028,767 | Mooney | June 4, 1912 |
| 1,366,910 | Hegrat | Feb. 1, 1921 |
| 1,641,249 | Blumental | Sept. 6, 1927 |
| 2,000,916 | Bloom | May 14, 1935 |
| 2,170,093 | Pringle et al. | Aug. 22, 1939 |
| 2,298,578 | Madsen | Oct. 13, 1942 |